US009713036B2

(12) United States Patent
Laselva et al.

(10) Patent No.: US 9,713,036 B2
(45) Date of Patent: Jul. 18, 2017

(54) METHOD AND APPARATUS FOR IMPLEMENTING A DISTRIBUTED INTERWORKING BASED ON USER EQUIPMENT THROUGHPUT

(71) Applicant: NOKIA SOLUTIONS AND NETWORKS OY, Espoo (FI)

(72) Inventors: Daniela Laselva, Klarup (DK); Istvan Zsolt Kovacs, Aalborg (DK); Per Henrik Michaelsen, Aalborg (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 157 days.

(21) Appl. No.: 14/698,494

(22) Filed: Apr. 28, 2015

(65) Prior Publication Data
US 2016/0323779 A1 Nov. 3, 2016

(51) Int. Cl.
H04W 4/00 (2009.01)
H04W 28/08 (2009.01)
H04B 17/309 (2015.01)
H04W 40/12 (2009.01)
H04W 28/02 (2009.01)
H04W 48/16 (2009.01)
H04L 12/725 (2013.01)
H04W 84/04 (2009.01)
H04W 84/12 (2009.01)

(52) U.S. Cl.
CPC ......... *H04W 28/08* (2013.01); *H04B 17/309* (2015.01); *H04L 45/30* (2013.01); *H04W 28/02* (2013.01); *H04W 40/12* (2013.01); *H04W 48/16* (2013.01); *H04W 84/042* (2013.01); *H04W 84/12* (2013.01)

(58) Field of Classification Search
CPC .............................. H04W 36/30; H04W 24/08
USPC ......................................... 370/329, 331, 332
See application file for complete search history.

(56) References Cited

U.S. PATENT DOCUMENTS 7,885,260 B2 * 2/2011 Paul .................... H04L 49/3009
370/363
2012/0082161 A1 * 4/2012 Leung ................. H04L 12/4633
370/392

(Continued)

FOREIGN PATENT DOCUMENTS

WO 2008/092849 A1 8/2008

OTHER PUBLICATIONS

European Search Report application No. 16167313.2 issued Jul. 22, 2016.

(Continued)

*Primary Examiner* — Ricky Ngo
*Assistant Examiner* — Dewanda Samuel
(74) *Attorney, Agent, or Firm* — Squire Patton Boggs (US) LLP

(57) ABSTRACT

A method and apparatus may include estimating a metric value relating to a first user equipment and an access point, without relying on actual data transmitted by the access point to the first user equipment. The method may also include estimating a quality degradation to the at least one second user equipment if at least part of the traffic of the first user equipment is routed to the access point. The method may also include performing routing of at least part of the traffic of the first user equipment based on the estimated metric value and the estimated degradation.

18 Claims, 5 Drawing Sheets

(56) References Cited

U.S. PATENT DOCUMENTS

| | | | |
|---|---|---|---|
| 2013/0210422 A1* | 8/2013 | Pani | H04W 8/02 455/423 |
| 2013/0235728 A1 | 9/2013 | Le et al. | |
| 2014/0003239 A1* | 1/2014 | Etemad | H04W 28/08 370/235 |
| 2014/0079022 A1* | 3/2014 | Wang | H04W 36/22 370/331 |
| 2014/0369201 A1 | 12/2014 | Gupta et al. | |
| 2015/0092553 A1 | 4/2015 | Sirotkin et al. | |
| 2015/0312831 A1* | 10/2015 | Sang | H04W 36/0083 370/236 |
| 2016/0212696 A1* | 7/2016 | Tu | H04W 28/08 |

OTHER PUBLICATIONS

3GPP TS 23.402 V12.7.0 (Dec. 2014) Technical Specification 3rd Generation Partnership Project; Technical Specification Group Services and System Aspects; Architecture enhancements for non-3GPP accesses (Release 12) pp. 1-290.

3GPP TS 36.304 V12.3.0 (Dec. 2014) Technical Specification 3rd Generation Partnership Project; Technical Specification Group Radio Access Network; Evolved Universal Terrestrial Radio Access (E-UTRA); User Equipment (UE) procedures in idle mode (Release 12), pp. 1-37.

IEEE 802.11 Networks: A Simple Model Geared Towards Offloading Studies and Considerations on Future Small Cells Luis G. Uzeda Garcia et al., pp. 1-6, 2013.

Nokia Corporation, et al.; 3GPP TSG-RAN WG2 Meeting #86, R2-142479, "Further Details on WLAN/3GPP Interworking Signaling", May 19-23, 2014, 3 pages.

Intel Corporation, Qualcomm Incorporated, 3GPP TSG RAN Meeting #66, RP-141964, "New SI Proposal: LTE-WLAN Radio Level Integration", Dec. 8-11, 2014, 6 pages.

China Telecom, Nokia Networks, Nokia Corporation, RP-141943, Motivation for New WI: Further Network-Controlled WLAN/3GPP Radio Interworking, Dec. 8-11, 2014, 3 pages.

Intel Corporation, RP-132101, "New Work Item Proposal: WLAN/3GPP Radio Interworking", Dec. 3-6, 2013, 6 pages.

* cited by examiner

METHOD AND APPARATUS FOR IMPLEMENTING A DISTRIBUTED INTERWORKING BASED ON USER EQUIPMENT THROUGHPUT

BACKGROUND

Field

Embodiments of the present invention relate to implementing a distributed interworking based on user equipment throughput.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include estimating, by a network node, a metric value relating to a first user equipment and an access point, without relying on actual data transmitted by the access point to the first user equipment. The method may also include estimating a quality degradation to at least one second user equipment if at least part of the traffic of the first user equipment is routed to the access point. The method may also include performing routing of at least part of the traffic of the first user equipment based on the estimated metric value and the estimated degradation.

In the method of the first embodiment, the estimating the metric value comprises estimating at least one of a throughput value, a user-quality metric, a quality-of-service metric, and a quality-of-experience metric, and the metric value is achievable by the first user equipment on the access point.

In the method of the first embodiment, the method may also include estimating whether activating radio aggregation between the network node and the access point, or routing from the network node to the access point, will provide sufficient benefit to the first user equipment. The method may also include adjusting a degradation threshold based on load information received from the access point.

In the method of the first embodiment, the network node comprises an evolved Node B, and the access point comprises a wireless-local-area-network access point.

In the method of the first embodiment, the network node estimates a received-signal-strength/quality threshold above which the first user equipment achieves a certain metric value with the access point.

In the method of the first embodiment, the certain metric value comprises a throughput that is higher than a current throughput experienced by the first user equipment.

In the method of the first embodiment, the performing the routing of at least part of the traffic of the first user equipment is performed if the estimated degradation to the at least one second user equipment is below a certain degradation threshold, and the certain degradation threshold is defined in terms of quality of service.

According to a second embodiment, an apparatus may include at least one processor. The apparatus may also include at least one memory including computer program code. The at least one memory and the computer program code may be configured, with the at least one processor, to cause the apparatus at least to estimate a metric value relating to a first user equipment and an access point, without relying on actual data transmitted by the access point to the first user equipment. The apparatus may also be caused to estimate a quality degradation to at least one second user equipment if at least part of the traffic of the first user equipment is routed to the access point. The apparatus may also be caused to perform routing of at least part of the traffic of the first user equipment based on the estimated metric value and the estimated degradation.

In the apparatus of the second embodiment, the estimating the metric value comprises estimating at least one of a throughput value, a user-quality metric, a quality-of-service metric, and a quality-of-experience metric, and the metric value is achievable by the first user equipment on the access point.

In the apparatus of the second embodiment, the apparatus is further caused to estimate whether activating radio aggregation between the apparatus and the access point, or routing from the apparatus to the access point, will provide sufficient benefit to the first user equipment. The apparatus is further caused to adjust a degradation threshold based on load information received from the access point.

In the apparatus of the second embodiment, the apparatus comprises an evolved Node B, and the access point comprises a wireless-local-area-network access point.

In the apparatus of the second embodiment, the network node estimates a received-signal-strength/quality threshold above which the first user equipment achieves a certain metric value with the access point.

In the apparatus of the second embodiment, the certain metric value comprises a throughput that is higher than a current throughput experienced by the first user equipment.

In the apparatus of the second embodiment, the performing the routing of at least part of the traffic of the first user equipment is performed if the estimated degradation to the at least one second user equipment is below a certain degradation threshold, and the certain degradation threshold is defined in terms of quality of service.

According to a third embodiment, a computer program product may be embodied on a non-transitory computer readable medium. The computer program product may be configured to control a processor to perform a method comprising estimating, by a network node, a metric value relating to a first user equipment and an access point, without relying on actual data transmitted by the access point to the first user equipment. The method may also include estimating a quality degradation to at least one second user equipment if at least part of the traffic of the first user equipment is routed to the access point. The method may also include performing routing of at least part of the traffic of the first user equipment based on the estimated metric value and the estimated degradation.

In the computer program product of the third embodiment, the estimating the metric value comprises estimating at least one of a throughput value, a user-quality metric, a quality-of-service metric, and a quality-of-experience metric, and the metric value is achievable by the first user equipment on the access point.

In the computer program product of the third embodiment, the computer program product is configured to control a processor to perform a method that also includes estimating whether activating radio aggregation between the network node and the access point, or routing from the network node to the access point, will provide sufficient benefit to the first user equipment. The method may also include adjusting a degradation threshold based on load information received from the access point.

In the computer program product of the third embodiment, the network node comprises an evolved Node B, and the access point comprises a wireless-local-area-network access point.

In the computer program product of the third embodiment, the network node estimates a received-signal-strength/quality threshold above which the first user equipment achieves a certain metric value with the access point.

In the computer program product of the third embodiment, the certain metric value comprises a throughput that is higher than a current throughput experienced by the first user equipment.

In the computer program product of the third embodiment, the performing the routing of at least part of the traffic of the first user equipment is performed if the estimated degradation to the at least one second user equipment is below a certain degradation threshold, and the certain degradation threshold is defined in terms of quality of service.

BRIEF DESCRIPTION OF THE DRAWINGS

For proper understanding of the invention, reference should be made to the accompanying drawings, wherein.

DETAILED DESCRIPTION

Figure 1:
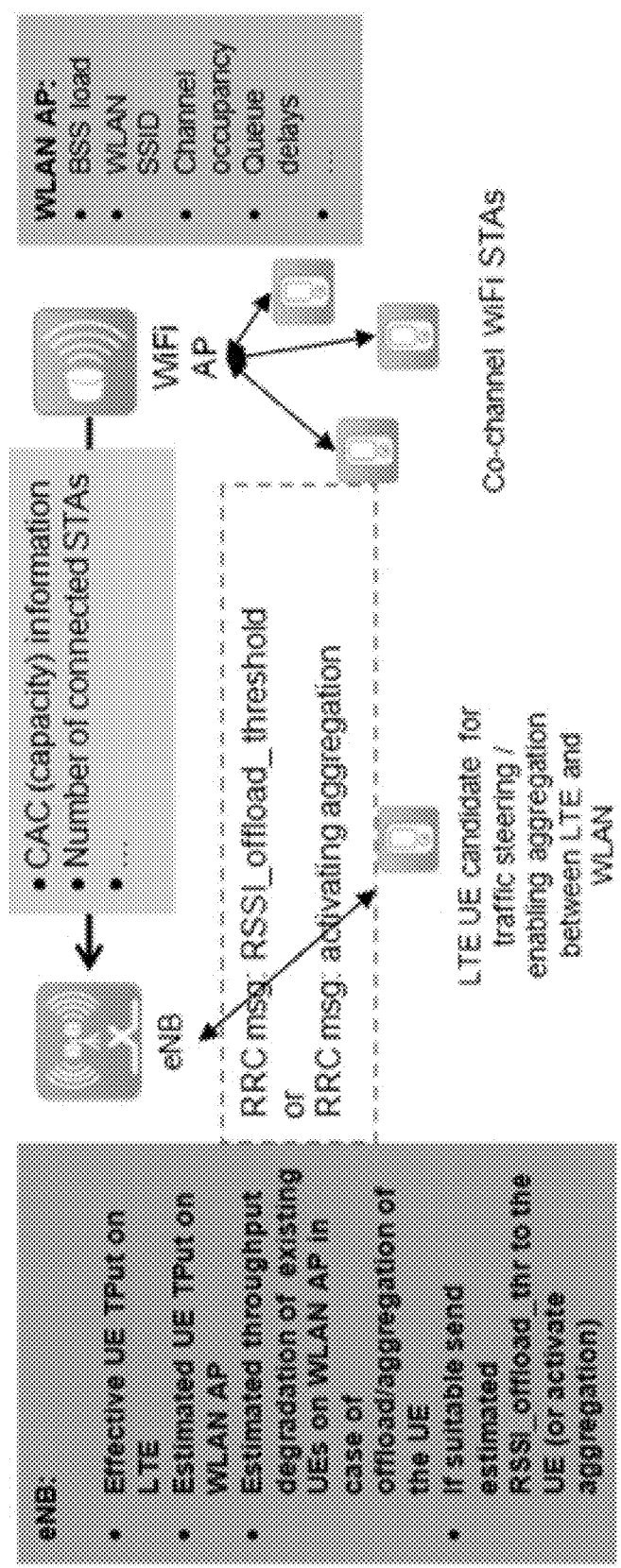
FIG. 1 illustrates Long-Term-Evolution-Wireless-Local-Area Network (LTE-WLAN) interworking and aggregation mechanisms that are based on evolved Node B (eNB) throughput estimation, using information exchanged between a WiFi Access Point and an LTE eNB.

Certain embodiments of the present invention relate to implementing an algorithm for distributed interworking between Long-Term-Evolution and Wireless-Local-Area-Network, where the algorithm is based on user equipment throughput. Certain embodiments of the present invention relate to implementing radio enhancements for 3GPP/WLAN interworking. The radio enhancements are directed at supporting improved network/operator-assisted/controlled connectivity over WLAN.

A 3GPP work item (RP-132101) was recently finalized, and the designed feature enables a cellular network to trigger dynamic traffic offload and traffic onload (where the traffic is offloaded/onloaded to and from WLAN). The dynamically triggered traffic offload and traffic onload may be UE-driven and Radio-Access-Network-assisted (RAN-assisted). This work item also describes 3G-WLAN interworking.

The onload/offload will occur if certain conditions relating to the RAN network and relating to the WLAN network are satisfied. The conditions may relate to, for example, measured cell loads and measured signal strengths of the RAN/WLAN networks. A UE is expected to evaluate actual measurement results against offload/onload threshold values that are provided by the RAN node. These threshold values may be provided to the UE as a part of RAN assistance information.

The Release 13 Work Item RP-150510 "LTE-WLAN Radio Level Integration and Interworking Enhancements" (from Intel) has been approved (in March 2015). This work item covers 2C/3C architectures based LTE-WLAN Radio Level Integration. Additionally, this work item also covers network-controlled LTE-WLAN Radio interworking solutions.

Certain embodiments of the present invention may relate to a 3GPP RAN WG3 study item on multi-radio-access-technology (multi-RAT) joint coordination, particularly with respect to discussions on a standardized interface between WLAN and 3GPP RAN. Currently, the scope of the interface is limited to the retrieval of Wi-Fi control information.

One method for implementing 3GPP/WLAN radio interworking (as specified by RAN WG2/SA2 in Release 12) relies on various thresholds. The various thresholds may be provided as a part of RAN assistance information. The thresholds may be used by the UE when evaluating offloading/onloading conditions. For example, the thresholds may be used by the UE in accordance with RAN-defined rules or Access Network Discovery and Selection Function (ANDSF) rules. Both network selection (at the start of a new connection) and traffic routing (during an existing connection) may be supported and governed by these rules. In this context, "offload" generally describes an attempt to move traffic from 3GPP to WLAN. In contrast, "onload" generally refers to an attempt to move traffic from WLAN to 3GPP.

The above terminology is based on the understanding that normal radio services will be handled through the network that the mobile operator has full control over. This network may be the radio access network (RAN). The above-mentioned thresholds may generally relate to the RAN (and WLAN) signal strength, signal quality, and load levels. Any threshold can be signalled to UEs in either IDLE and CONNECTED mode by using broadcast messages (via system information blocks (SIB)) from the RAN. In addition, UEs in CONNECTED mode can receive any of the thresholds via dedicated signalling (Radio-Resource-Control (RRC) signalling) as well. The thresholds received via dedicated signalling may overwrite the thresholds received via SIBs. The overwritting may be performed in accordance with a validity timer, which may also be provided to UEs.

Technical Specification (TS) 36.304 describes the conditions that the UEs have to evaluate, as described below:

The upper layers in the UE shall be notified (see TS 23.402 when and for which WLAN identifiers (part of the list in subclause 5.6.3) the following conditions 1 and 2 for steering traffic from E-UTRAN to WLAN are satisfied for a time interval $Tsteering_{WLAN}$:

1. In the E-UTRAN serving cell:
$RSRPmeas < Thresh_{ServingOffloadWLAN,\ LowP}$; or
$RSRQmeas < Thresh_{ServingOffloadWLAN,\ LowQ}$;

2. In the target WLAN:
$ChannelUtilizationWLAN < Thresh_{ChUtilWLAN,\ Low}$; and
$BackhaulRateDlWLAN > Thresh_{BackhRateDLWLAN,\ High}$; and
$BackhaulRateUlWLAN > Thresh_{BackhRateULWLAN,\ High}$; and
$BeaconRSSI > Thresh_{BeaconRSSIWLAN,\ High}$;

The UE shall not consider the metrics for which a threshold has not been provided. The UE shall evaluate the E-UTRAN conditions on PCell only. If not all metrics related to the provided thresholds can be acquired for a WLAN BSS, the UE shall exclude that WLAN BSS from the evaluation of the above rule.

The upper layers in the UE shall be notified (see TS 24.302 [28]) when the following conditions 3 or 4 for steering traffic from WLAN to E-UTRAN are satisfied for a time interval $Tsteering_{WLAN}$:

3. In the source WLAN:
ChannelUtilizationWLAN>$Thresh_{ChUtilWLAN, High}$; or
BackhaulRateDlWLAN<$Thresh_{BackhRateDLWLAN, Low}$; or
BackhaulRateUlWLAN<$Thresh_{BackhRateULWLAN, Low}$; or
BeaconRSSI<$Thresh_{BeaconRSSIWLAN, Low}$;

4. In the target E-UTRAN cell:
RSRPmeas>$Thresh_{ServingOffloadWLAN, HighP}$; and
RSRQmeas>$Thresh_{ServingOffloadWLAN, HighQ}$;

The UE shall not consider the metrics for which a threshold has not been provided. The UE shall evaluate the E-UTRAN conditions on PCell only.

A method of implementing the above-mentioned RAN assistance thresholds in order to achieve controllable LTE-WLAN offloads, and in order to improve UE Quality-of-Service (QoS), has yet to be determined. Certain embodiments of the present invention implement the above-mentioned RAN assistance thresholds by allowing RAN to set the received-signal-strength-indication/received-signal-received-power (RSSI/RSRP) thresholds, with a goal of maximizing UE throughput.

Also, certain embodiments of the present invention avoid offloading decisions which result in throughput degradation of the existing UEs (where the existing UEs are served by the WLAN AP to which the offloading is to occur for). Degradation of throughput for the existing UEs would trigger system instability and possibly trigger LTE-WLAN ping pongs. Specifically, as a consequence of an offloading, a consequent onload may be triggered. The same mechanism can also be applied to the determination of whether to activate aggregation or not for a given UE.

Certain embodiments of the present invention are directed to a method for RAN to set throughput-based offload/onload thresholds. The throughput-based offload/onload thresholds may be set in order to trigger an offload/onload decision of CONNECTED UEs from 3GPP to WLAN. The thresholds may be set with the objective of maximizing the UE QoS/throughput for a user for which the decision/setting is made. The throughput-based offload/onload thresholds may also be set in order to avoid the degradation of the existing UEs (served on WLAN) above a controlled level when a new UE is offloaded to WLAN. Larger degradation (above the controlled level) would generally cause system instability. For example, the offload of a UE may cause the onload of one of more among the existing UEs. The same throughput-based mechanism can be applied to decide whether aggregation operations between LTE and WLAN should be activated for a given UE in order to provide a sufficiently high throughput benefit. Before actually performing aggregation, determining that the aggregation will result in a high throughput benefit may be necessary because aggregation requires significant signalling overhead and additional UE power consumption.

FIG. 1 illustrates LTE-WLAN interworking and aggregation mechanisms based on eNB throughput estimation, using information exchange between a WiFi Access Point and an LTE eNB. The principles illustrated by FIG. 1 may also be directed to 3G-WLAN interworking and aggregation. The method comprises the following features. One feature is to estimate a threshold received-signal-strength-indicator (RSSI) that should be measured for signals between a UE and an Access Point (AP) in order to achieve better throughput in WLAN within a certain configurable margin. This threshold may correspond to a minimum RSSI value that a UE should measure to an Access Point (AP) in order to achieve better throughput in WLAN within a certain configurable margin. This threshold may also correspond to a minimum RSSI value that the UE should measure in order to achieve a certain fixed throughput value. The better throughput is achieved in consideration of all the existing users connected to that AP, compared to the throughput of the UE when being served in LTE. Another feature is to estimate the amount of degradation caused to the throughput of the existing UEs (associated to an AP) when a new UE is served as well by the AP. Another feature is to avoid offloading of a UE to an AP when degradation is above a certain threshold, where the offloading may possibly cause onloading of any of the existing UEs. The degradation threshold could be defined per QoS, and per access classes as well. The degradation threshold may be defined in terms of QoS, throughput, delay, latency, packet losses, or quality of experience. Another feature of certain embodiments of the present invention is to estimate whether activating aggregation between LTE and WLAN for a given UE will provide a sufficient benefit. Updated load information retrieved from the AP may be used at the eNB to adjust the degradation thresholds.

As described in more detail below, two use cases are identified: (1) an aggregation use case, and (2) an offloading use case. The first use case refers to the activation of aggregation operations for the given UE. The second use case refers instead to the triggering of offloading for the given UE. The triggering may be based on Release 12 RSSI threshold-based WLAN radio interworking. Implementation of the proposed LTE/WLAN interworking algorithm (based on UE throughput) includes the following details.

The eNB receives traffic load information (possibly on request) from the WiFi APs within the eNB's coverage. The traffic load information may include: (1) Call-Admission-Control (CAC) related metric (CACap) along with a Maximum (theoretical) capacity of the AP (Cap), (2) a number of connected stations/terminals (STAs) to the serving AP (Nsta), and/or (3) the average downstream STA throughput (Wsta) served by the AP.

The CACap may be assumed to be proportional to one minus the ratio of the (long term average) served AP traffic, Wtraff, and the maximum (theoretical) capacity of the AP, Cap:

$$CAC_{ap} \sim \left(1 - \frac{W_{traff}}{C_{ap}}\right) \text{ or } W_{traff} \sim C_{ap} \cdot (1 - CAC_{ap}) \quad (1)$$

The eNB is capable of identifying the most suitable AP that a UE should connect to in the event of offloading/aggregation. In the case of aggregation, the UE may report UE RSSI towards the AP.

For a currently served LTE UE, the eNB estimates, periodically or on some event basis, the throughput, Wnew, that the UE would achieve, in the event that the UE is connected to the selected AP which already serves $N_{STA}$, with served AP traffic, Wtraff, according to (1). Such an estimate is assumed to be possible on the basis of the considered information exchanged between the AP and the eNB as in step 1. A possible estimation algorithm is provided below.

$$W_{new}(PHY_{NEW}) = \frac{N_{sta}}{(N_{sta} + 1)^2} \cdot \left(\frac{1}{W_{traff}} + \frac{1}{MA_{eff} \cdot PHY_{NEW}}\right)^{-1}, \quad (2)$$

where: PHYnew is the Wi-Fi Physical throughput for the new STA. With the offloading use case, PHYnew (or MCS) can be associated with a UE RSSI value based on the expected (or vendor specified) mapping function: $PHY_i=f1(RSSI_i)$, (3) or $MCS_i=f2(RSSI_i)$, (4). With the aggregation use case, PHYnew is assumed to be known in case based on the UE reporting of RSSI according to (3) or (4). The expression (3)/(4) are assumed to incorporate the UE Wi-Fi capabilities such as standard version, MIMO support or multiband operation.

MAeff is a WLAN medium access efficiency parameter. The parameter may need to be estimated from other information sources, for example, from a WLAN BSS load in combination with a type of WiFi (11g/n/ac) in use. Alternatively, this parameter can also be considered as a self-optimized network (SON) adaptation parameter, which can be adjusted based on the outcome of previous traffic steering decisions. Typical MAeff values may be in a range of 0.5 to 0.9 for 802.11n/ac.

For a currently-served LTE UE, the eNB determines, periodically or on some event basis, whether it is beneficial to perform either offloading to the AP or to activate aggregation with the AP.

With the offloading use case, offloading should be triggered only when: (1) the UE can achieve (in the AP) a throughput higher than the UE currently receives on LTE, $L_{ue}$, for example, $L_{ue} \cdot D_{tp}$, where $D_{tp} >= 1$, and (2) the existing UEs connected to the AP do not degrade their throughput, $W_{initial}$, below a certain configurable level, $W_{initial} \cdot D_W$, where $D_W \leq 1$.

With the aggregation use case, aggregation should be triggered when the UE can achieve a significant contribution to its current LTE throughput via the AP in order to justify the overhead caused by aggregation. The minimum level of the contribution, $D_{tp} \cdot L_{ue}$, is configurable based on the margin/delta value, where typically $D_{tp} > minD_{tp}$. As above, the existing UEs connected to the AP do not degrade their throughput, $W_{initial}$, below a certain configurable level, $W_{initial} \cdot D_W$, where $D_W \leq 1$.

The above objectives are met if the following condition is satisfied:

$$W_{new}(PHY_{NEW}) \geq \max(D_{tp} \cdot L_{ue}; W_{initial} \cdot D_w), \quad (5)$$

where Lue is the throughput that the UE currently receives on LTE.

$$W_{initial} \cong \frac{W_{traff}}{N_{sta}+1} \cdot \frac{C_{ap}(1-CAC_{ap})}{N_{sta}+1}$$

is the estimate of the current UE throughput that the existing UEs are being served over the AP. Dtp is a configurable parameter which describes the throughput margin/delta value as described above. This parameter could be configured according to the UE QoS, for example, QoS Class Identifier (QCI), Guaranteed Bit Rate (GBR), Allocation and Retention Priority (ARP), Subscriber profile ID (SPID), etc. Dw is a configurable parameter which describes the maximum allowed degradation for the existing UEs when the new UE is served additionally by the AP. This parameter could be configured according to the UE QoS, for example, QCI, GBR, ARP, SPID, etc.

For the offloading use case, if the PHYnew estimation according to (2) and (5) results in a value of the minimum WiFi RSS level (RSSmin) for the new STA feasible according to (3)/(4), and potentially also in a desired (pre-set) range, then the eNB provides to the target UE (via dedicated signalling) the new value for the new Release 12 RSSI threshold, $Thresh_{BeaconRSSIwLAN, High}$=RSSmin as derived according to (2), (3)/(4), and (5).

For the Aggregation use case: if (5) is fulfilled, the eNB will start the preparation for aggregation with respect to the AP and send an RRC message to the UE informing about the activation of aggregation operations.

Certain embodiments of the present invention provide QoS/throughput-based RAN control over the offloading, and offer RAN tools to be aware of and to mitigate degradation in the WLAN performance. Specifically, certain embodiments of the present invention allow RAN to set the RSSI offload thresholds with the goal of maximizing UE throughput. Also certain embodiments avoid the scenario where an offload decision results in throughput degradation of the existing UEs, which would trigger system instability and LTE-WLAN ping pongs. Ping pongs result, for example, when, after performing an offloading, a consequent onload is triggered. The same mechanism can be also applied to the determination of whether to activate aggregation or not for a given UE. A same mechanism (degradation-metric based mechanism) can be used to disable aggregation and/or to initiate onloading.

The following describes the detailed estimation performed by the eNB. The long term average downstream WiFi Medium Access Control (MAC) goodput for any of the STAs (served by the k-th AP) can be estimated. The long term average downstream WiFi MAC goodput may be estimated based on the assumption of full buffer downstream and upstream traffic, using the equations (3), (5), and (6), in reference

[1]:

$$W_{sta}^k = \frac{MAC_{eff}}{\left(K_{ap}+\sum_{i=1}^{K_{ap}} N_{sta}^i\right)} \frac{MA_{eff}}{\left(K_{ap}+\sum_{i=1}^{K_{ap}} N_{sta}^i\right)} \cdot \frac{1}{N_{sta}^k} \cdot \left(\frac{1}{L}\sum_{l=1}^{L}\frac{1}{PHY_l}\right)^{-1} \quad (A)$$

$$\cong \frac{MAC_{eff}}{N_{sta}+1} \cong \frac{MA_{eff}}{N_{sta}+1} \cdot \left(\sum_{n=1}^{K_{ap} \cdot N_{sta}} \frac{1}{PHY_n}\right)^{-1} \text{ with}$$

$$N_{sta} = N_{sta}^i \geq 1 \forall i = 1 \ldots K_{ap}$$

with $$L = 2 \cdot \sum_{i=1}^{K_{ap}} N_{sta}^i$$

$$\cong 2 \cdot K_{ap} \cdot N_{sta} \text{ with } N_{sta} = N_{sta}^i \geq 1 \forall i = 1 \ldots K_{ap}$$

and $$PHY_l = f(RSS_l, MCS_l) \quad (B)$$

MAeff is the medium access efficiency parameter, which depends on the WiFi standard in use (such as 802.11g/n/ac), traffic load, and the associated air-interface signalling overheads. Kap is the total number of WiFi APs that operate on the same channel as the k-th AP. L is the total number of competing links (downstream and upstream data flows) from all APs and STAs operating on the same channel as the k-th AP (and its STAs). PHYl is the physical layer WiFi data rate on the l-th AP-STA link (downstream and upstream data flows) corresponding to an average RSS level on the link and a selected MCS. This mapping is generally vendor specific and would have to be available for the specific type(s) of WLAN APs used in the network.

The approximations in (A) and (B) are valid under the general assumption that each of the Kap APs serves (on average) the same number of STAs, Nsta, and that the downstream and upstream links use the same physical layer WiFi data rate, PHYn.

Additionally, from expressions (A) and (B) above, the following relationship may also be assumed:

$$W_{traff} \sim C_{ap} \cdot (1 - CA_{ap}) \cong MA_{eff} \cdot \left( \sum_{n=1}^{K_{ap} \cdot N_{sta}} \frac{1}{PHY_n} \right)^{-1} = \qquad (C)$$

$$W_{sta} \cdot (N_{sta} + 1)$$

Therefore, if only the Nsta is available directly but Wsta is not available, then the STA MAC goodput estimate is given by:

$$W_{sta} \cong \frac{W_{traff}}{N_{sta} + 1} \sim \frac{C_{ap}(1 - CAC_{ap})}{N_{sta} + 1} \qquad (D1)$$

or else, when Wsta is available directly but not Nsta, then the number of connected STAs can be estimated with:

$$N_{sta} \cong \frac{W_{traff}}{W_{sta}} - 1 \sim \frac{C_{ap}(1 - CAC_{ap})}{W_{sta}} - 1 \qquad (D2)$$

The new MAC goodput for any of the STAs served by the k-th AP after connecting a new STA to it is estimated using (B) and (D):

$$W_{sta}^{k-NEW} \cong \frac{MA_{eff}}{(K_{ap} + K_{ap} \cdot N_{sta} + 1)(N_{sta} + 1)} \cdot$$

$$(K_{ap} \cdot N_{sta} + 1) \cdot \left( \sum_{n=1}^{K_{ap} \cdot N_{sta}+1} \frac{1}{PHY_n} \right)^{-1}$$

$$= \frac{(K_{ap} \cdot N_{sta} + 1)}{(K_{ap} + K_{ap} \cdot N_{sta} + 1)(N_{sta} + 1)} \cdot \left( \frac{1}{W_{traff}} + \frac{1}{MA_{eff} \cdot PHY_{NEW}} \right)^{-1}$$

with $N_{sta} = N_{sta}^i \geq 1 \forall i = 1 \ldots K_{ap}, i \neq k$ $$\cong \frac{N_{sta}}{(N_{sta} + 1)^2} \cdot \left( \frac{1}{W_{traff}} + \frac{1}{MA_{eff} \cdot PHY_{NEW}} \right)^{-1}$$

Figure 2:
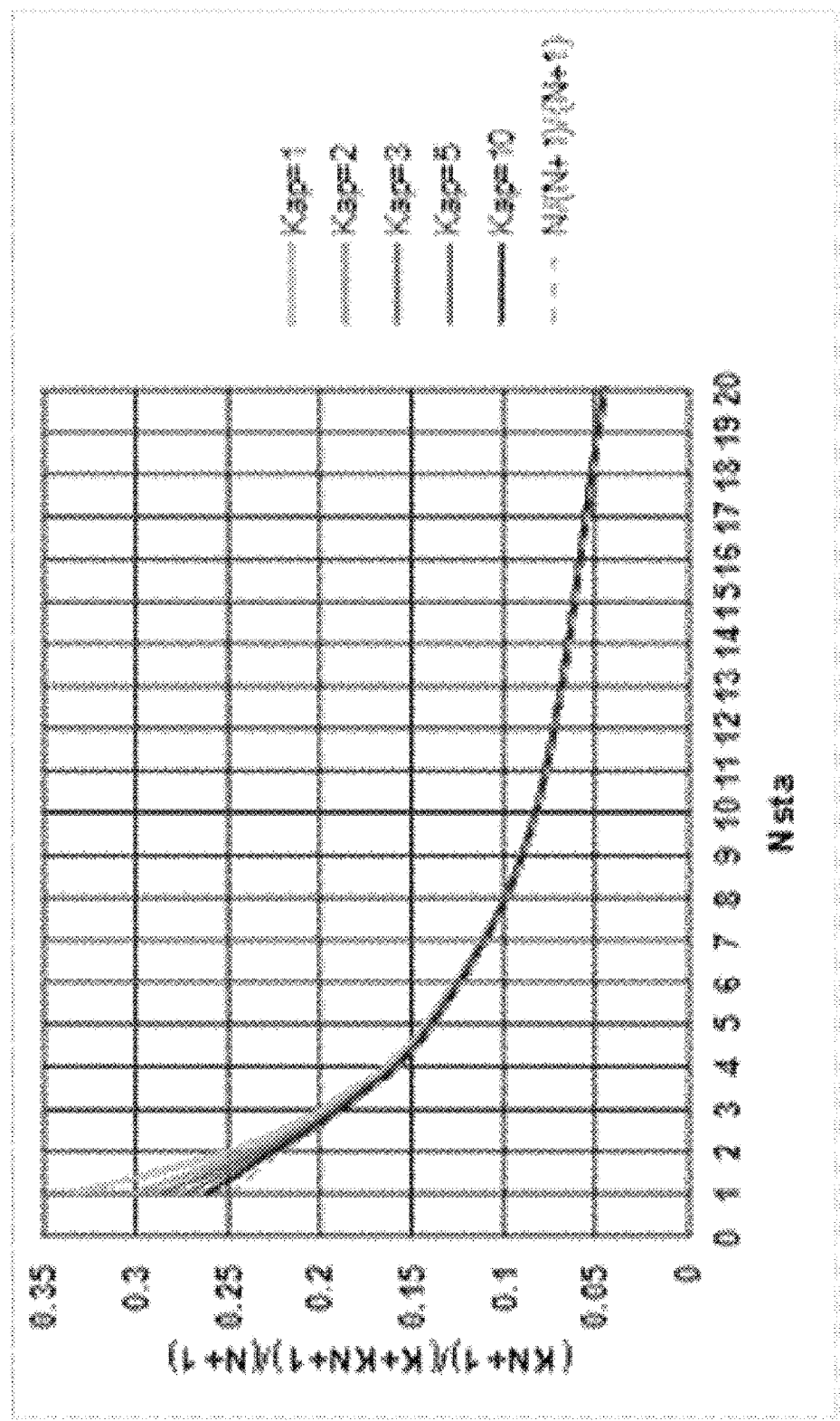
FIG. 2 illustrates a validity of the approximation used in expression (F) as a function of Kap and Nsta parameters.

The last approximation in (F) is valid, see FIG. 2, assuming Kap*Nsta>>1, thus:

$$\frac{(K_{ap} \cdot N_{sta} + 1)}{(K_{ap} + K_{ap} \cdot N_{sta} + 1)(N_{sta} + 1)} \cong \frac{K_{ap} \cdot N_{sta}}{K_{ap}(N_{sta} + 1)(N_{sta} + 1)}$$

$$= \frac{N_{sta}}{(N_{sta} + 1)^2}$$

FIG. 2 illustrates a validity of the approximation used in expression (F) as a function of the Kap and Nsta parameters.

Figure 3:
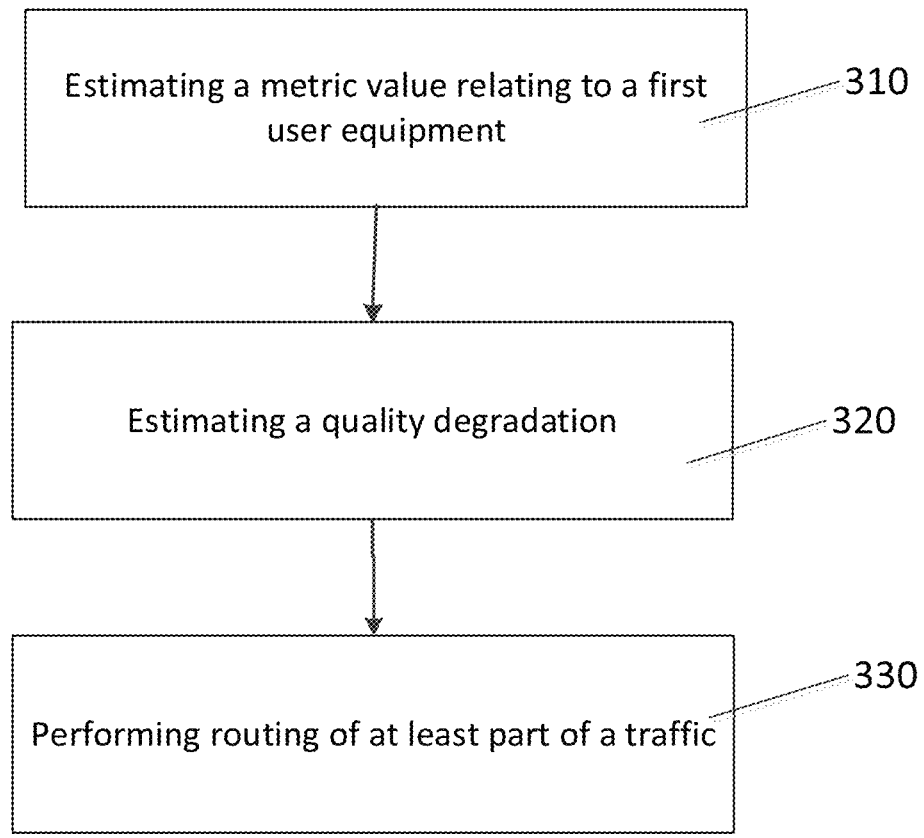
FIG. 3 illustrates a flowchart of a method in accordance with certain embodiments of the invention.

FIG. 3 illustrates a flowchart of a method in accordance with certain embodiments of the invention. The method illustrated in FIG. 3 includes, at 310, estimating, by a network node, a metric value relating to a first user equipment and an access point, without relying on actual data transmitted by the access point to the first user equipment. The method also includes, at 320, estimating a quality degradation to at least one second user equipment if at least part of the traffic of the first user equipment is routed to the access point. The method also includes, at 330, performing routing of at least part of the traffic of the first user equipment based on the estimated metric value and the estimated degradation.

Figure 4:
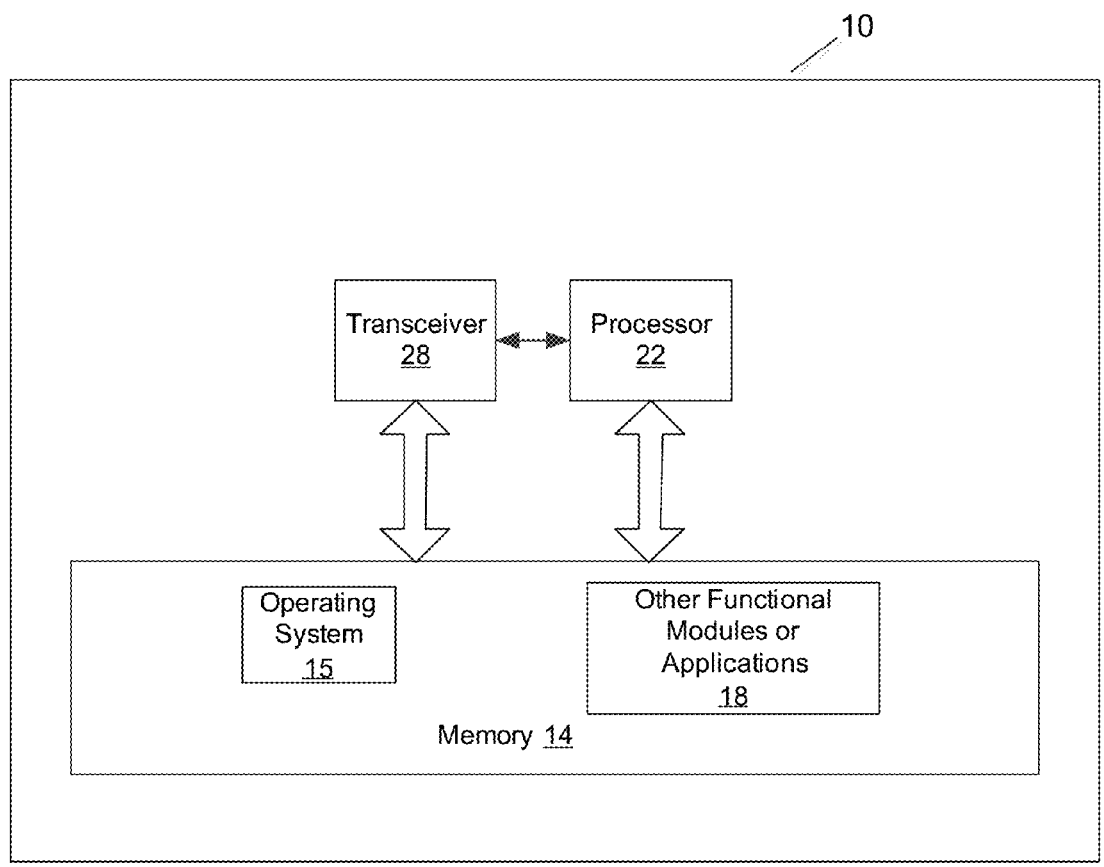
FIG. 4 illustrates an apparatus in accordance with certain embodiments of the invention.

FIG. 4 illustrates an apparatus in accordance with certain embodiments of the invention. In one embodiment, the apparatus can be a user equipment, a base station, and/or an evolved Node B, for example. The apparatus can be a network node. Apparatus 10 can include a processor 22 for processing information and executing instructions or operations. Processor 22 can be any type of general or specific purpose processor. While a single processor 22 is shown in FIG. 4, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 5:
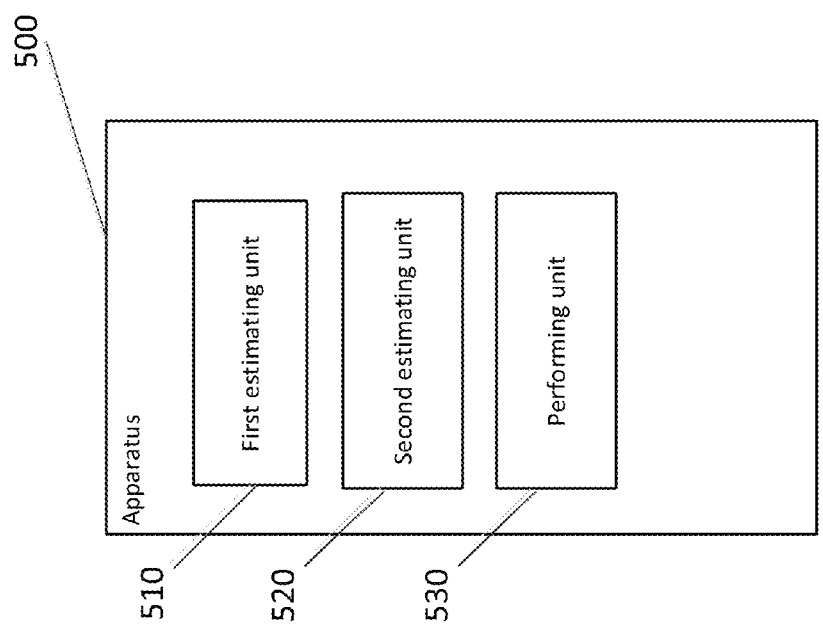
FIG. 5 illustrates an apparatus in accordance with certain embodiments of the invention.

FIG. 5 illustrates an apparatus in accordance with certain embodiments of the invention. Apparatus 500 can be a network element/entity such as a base station and/or evolved Node B, for example. Apparatus 500 can include a first estimating unit 510 that estimates a metric value relating to a first user equipment and an access point, without relaying on actual data transmitted by the access point to the first user equipment. Apparatus 500 may also include a second estimating unit 520 that estimates a quality degradation to at least one second user equipment if at least part of the traffic of the first user equipment is routed to the access point. Apparatus 500 may also include a performing unit 530 that performs routing of at least part of the traffic of the first user equipment based on the estimated metric value and the estimated degradation.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
    estimating, by a network node, a metric value relating to a first user equipment and an access point, without relying on actual data transmitted by the access point to the first user equipment;
    estimating a quality degradation to at least one second user equipment based at least in part on a degradation threshold, if at least part of the traffic of the first user equipment is routed to the access point;
    estimating whether activating radio aggregation between the network node and the access point, or routing from the network node to the access point, will provide sufficient benefit to the first user equipment;
    adjusting the degradation threshold based on load information received from the access point; and
    performing at least one of aggregation or routing of at least part of the traffic of the first user equipment based on the estimated metric value and the estimated degradation.

2. The method according to claim 1, wherein the estimating the metric value comprises estimating at least one of a throughput value, a user-quality metric, a quality-of-service metric, and a quality-of-experience metric, and the metric value is achievable by the first user equipment on the access point.

3. The method according to claim 1, wherein the network node comprises an evolved Node B, and the access point comprises a wireless-local-area-network access point.

4. The method according to claim 1, wherein the network node estimates a received-signal-strength/quality threshold above which the first user equipment achieves a certain metric value with the access point.

5. The method according to claim 4, wherein the certain metric value comprises a throughput that is higher than a current throughput experienced by the first user equipment.

6. The method according to claim 1, wherein the performing the routing of at least part of the traffic of the first user equipment is performed if the estimated degradation to the at least one second user equipment is below a certain degradation threshold, and the certain degradation threshold is defined in terms of quality of service.

7. An apparatus, comprising:
    at least one processor; and
    at least one memory including computer program code, the at least one memory and the computer program code configured, with the at least one processor, to cause the apparatus at least to
    estimate a metric value relating to a first user equipment and an access point, without relying on actual data transmitted by the access point to the first user equipment;
    estimate a quality degradation to at least one second user equipment based at least in part on a degradation threshold, if at least part of the traffic of the first user equipment is routed to the access point;
    estimate whether activating radio aggregation between the network node and the access point, routing from the network node to the access point, will provide sufficient benefit to the first user equipment;
    adjust the degradation threshold based on load information received from the access point; and
    perform at least one of aggregation or routing of at least part of the traffic of the first user equipment based on the estimated metric value and the estimated degradation.

8. The apparatus according to claim 7, wherein the estimating the metric value comprises estimating at least one of a throughput value, a user-quality metric, a quality-of-service metric, and a quality-of-experience metric, and the metric value is achievable by the first user equipment on the access point.

9. The apparatus according to claim 7, wherein the apparatus comprises an evolved Node B, and the access point comprises a wireless-local-area-network access point.

10. The apparatus according to claim 7, wherein the network node estimates a received-signal-strength/quality threshold above which the first user equipment achieves a certain metric value with the access point.

11. The apparatus according to claim 10, wherein the certain metric value comprises a throughput that is higher than a current throughput experienced by the first user equipment.

12. The apparatus according to claim 7, wherein the performing the routing of at least part of the traffic of the first user equipment is performed if the estimated degradation to the at least one second user equipment is below a certain degradation threshold, and the certain degradation threshold is defined in terms of quality of service.

13. A computer program product, embodied on a non-transitory computer readable medium, the computer program product configured to control a processor to perform a method comprising:
    estimating, by a network node, a metric value relating to a first user equipment and an access point, without relying on actual data transmitted by the access point to the first user equipment;
    estimating a quality degradation to at least one second user equipment based at least in part on a degradation threshold, if at least part of the traffic of the first user equipment is routed to the access point;

estimating whether activating radio aggregation between the network node and the access point, or routing from the network node to the access point, will provide sufficient benefit to the first user equipment;

adjusting the degradation threshold based on load information received from the access point; and performing at least one of aggregation or routing of at least part of the traffic of the first user equipment based on the estimated metric value and the estimated degradation.

14. The computer program product according to claim 13, wherein the estimating the metric value comprises estimating at least one of a throughput value, a user-quality metric, a quality-of-service metric, and a quality-of-experience metric, and the metric value is achievable by the first user equipment on the access point.

15. The computer program product according to claim 13, wherein the network node comprises an evolved Node B, and the access point comprises a wireless-local-area-network access point.

16. The computer program product according to claim 13, wherein the network node estimates a received-signal-strength/quality threshold above which the first user equipment achieves a certain metric value with the access point.

17. The computer program product according to claim 16, wherein the certain metric value comprises a throughput that is higher than a current throughput experienced by the first user equipment.

18. The computer program product according to claim 13, wherein the performing the routing of at least part of the traffic of the first user equipment is performed if the estimated degradation to the at least one second user equipment is below a certain degradation threshold, and the certain degradation threshold is defined in terms of quality of service.

* * * * *